Jan. 19, 1954

R. C. SHOEMAKER 2,666,532

FAIR-LEAD

Filed Dec. 9, 1950

INVENTOR
ROBERT C. SHOEMAKER

BY
ATTORNEY

Jan. 19, 1954 R. C. SHOEMAKER 2,666,532
FAIR-LEAD
Filed Dec. 9, 1950 5 Sheets-Sheet 3
FIG. 4.
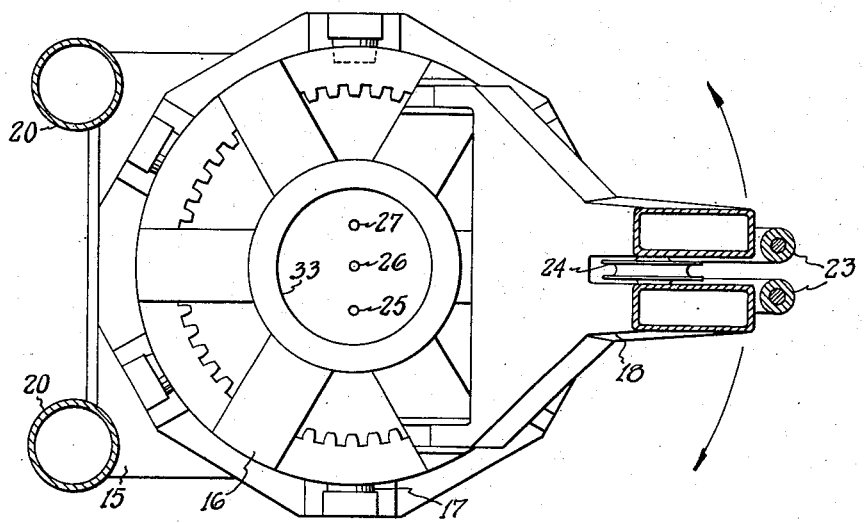
FIG. 5.
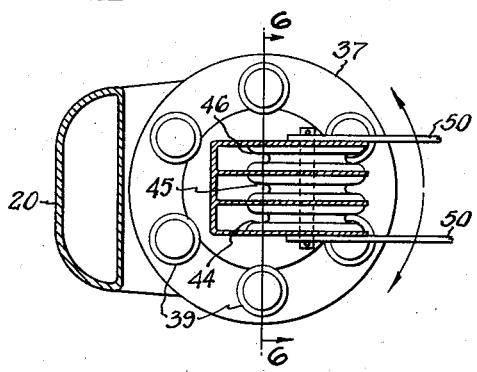
FIG. 6.
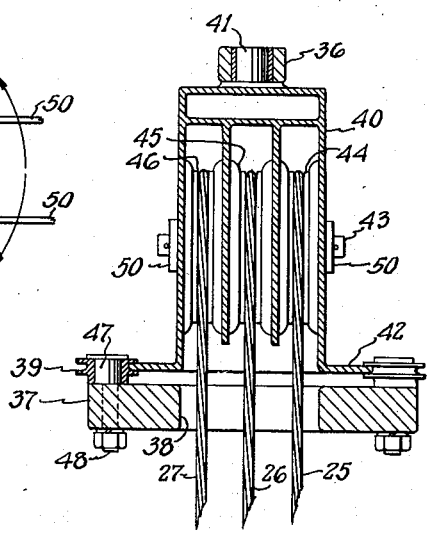
FIG. 7.
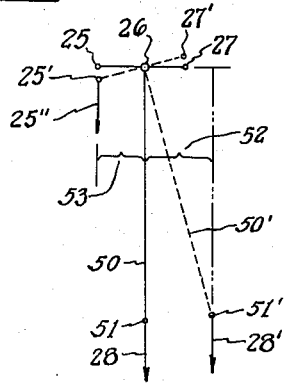
INVENTOR
ROBERT C. SHOEMAKER
ATTORNEY Jan. 19, 1954
R. C. SHOEMAKER
2,666,532
FAIR-LEAD
Filed Dec. 9, 1950
5 Sheets-Sheet 4
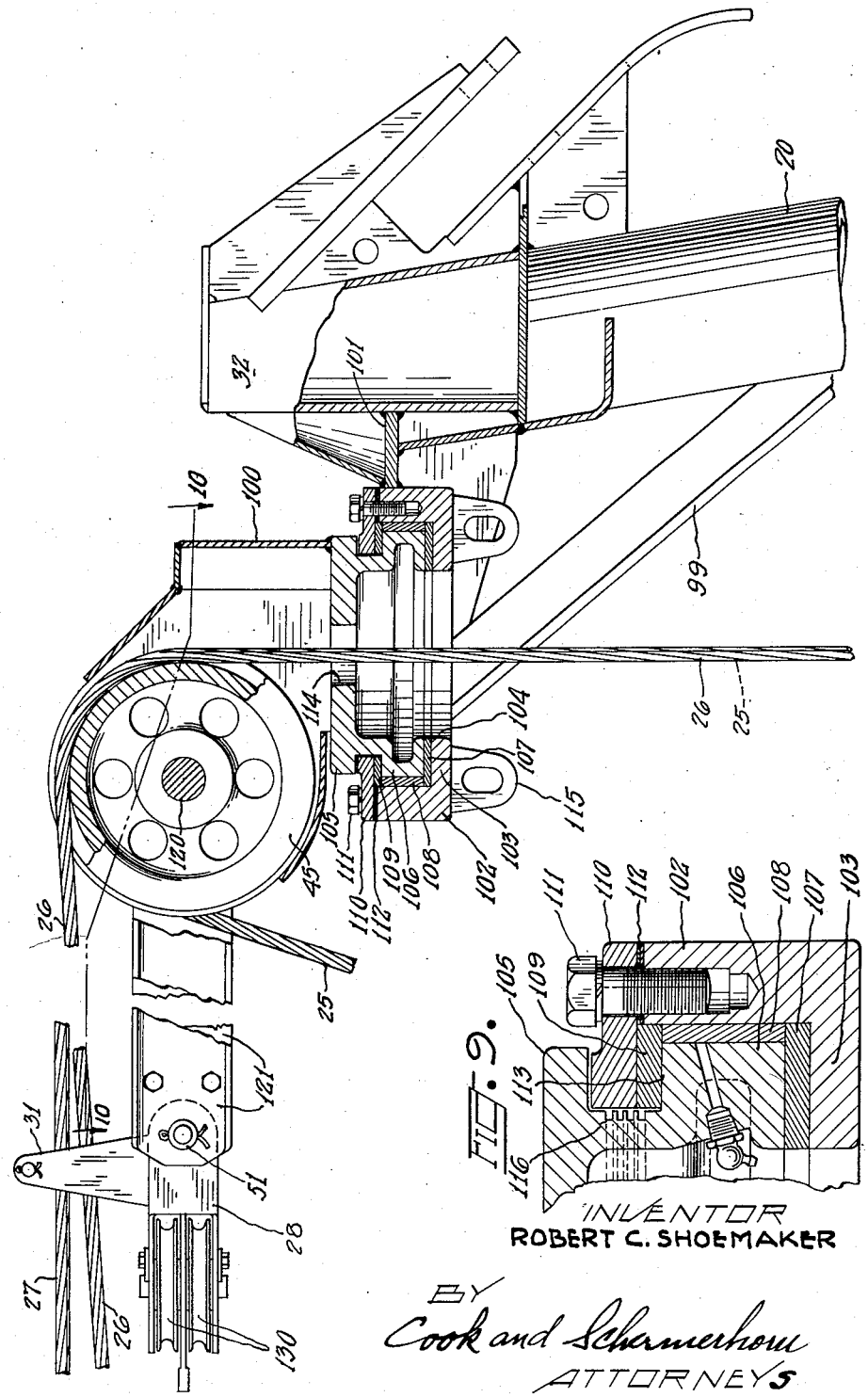
INVENTOR
ROBERT C. SHOEMAKER
BY
Cook and Schermerhorn
ATTORNEYS Jan. 19, 1954 R. C. SHOEMAKER 2,666,532
FAIR-LEAD
Filed Dec. 9, 1950 5 Sheets-Sheet 5
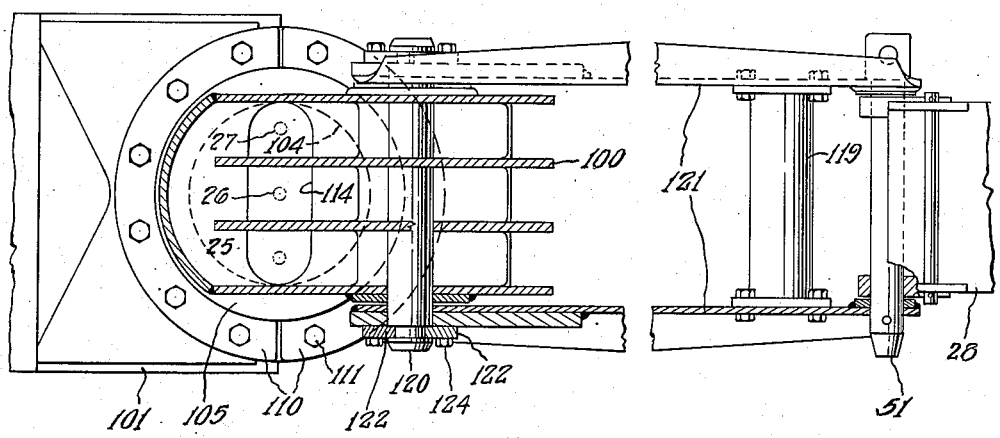
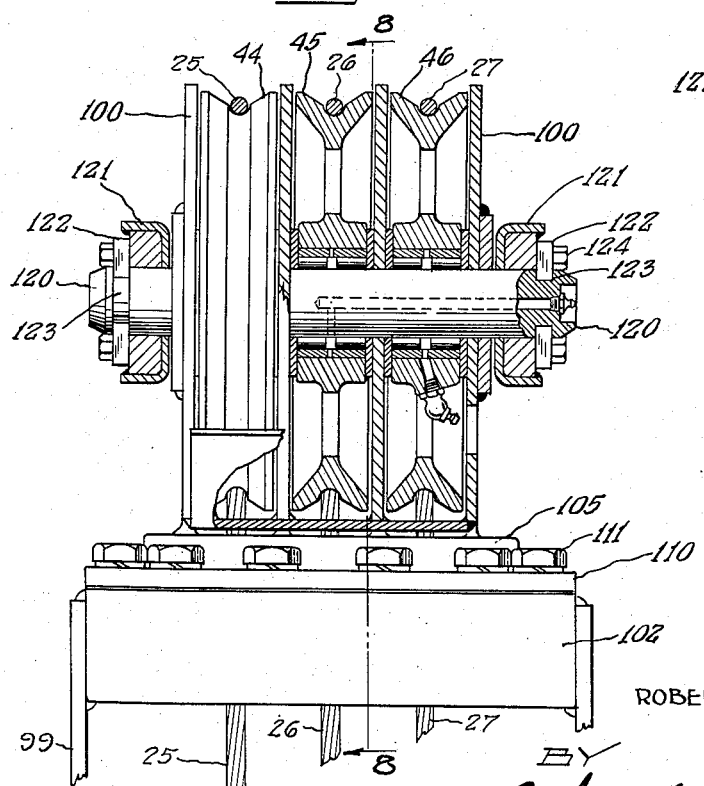
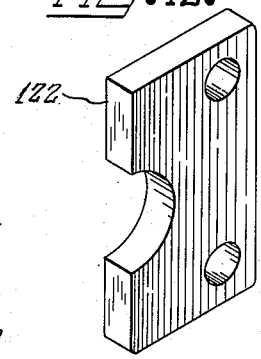
INVENTOR
ROBERT C. SHOEMAKER
BY
Cook and Schermerhorn
ATTORNEYS Patented Jan. 19, 1954

2,666,532

UNITED STATES PATENT OFFICE 2,666,532

FAIR-LEAD

Robert C. Shoemaker, Portland, Oreg., assignor to Hyster Company, Portland, Oreg., a corporation of Oregon Application December 9, 1950, Serial No. 200,035

5 Claims. (Cl. 212—70)

1

This invention relates to a novel fair-lead construction, and has particular reference to a masthead fair-lead for use on a stationary mast for directing a plurality of lines to a revolving boom. This application is a continuation-in-part of application Serial No. 626,112, filed November 1, 1945, now abandoned.

The present fair-lead is embodied in a novel crane construction particularly intended for rear mounting on a crawler type tractor. The mast carrying the fair-lead is mounted on horizontal pivots at the rear of the tractor body adjacent the rigid axle support interconnecting the crawler traction units on opposite sides of the body. At the base of the mast there is mounted on the tractor body a hoist unit having three cable drums or sheaves (not shown) approximately centrally disposed beneath a revolving bull wheel on which a crane boom is pivotally mounted. In view of the fact that such equipment is often used on uneven ground which causes tilting of the bull wheel axis of rotation out of the true vertical, adjustable means are provided for backstaying the mast in such a position that the masthead fair-lead is brought into approximately vertical alignment above the center of the bull wheel. With the tip of the boom suspended from the fair-lead, the true axis of rotation of the boom tip is on the line connecting the pivotal center of the fair-lead with the pivotal center of the bull wheel and may thus be adjusted to approximately vertical position regardless of inclination of the bull wheel axis.

For the present purpose, this type of construction requires three cables grouped as closely as possible around this vertical axis and extending upwardly from three cable drums or sheaves beneath the bull wheel, to the fair-lead, from whence they are directed to the boom in whatever direction it may be turned. Inasmuch as all three cables cannot be disposed exactly on this axis in the fair-lead, it is apparent that certain cables will be at a distance from the axis and in a position to exert a turning moment on the fair-lead. Unequal tensions in cables passing through the fair-lead on opposite sides of its pivotal axis thus produce eccentric loading on the fair-lead tending to deflect it away from the direction of lead of the cables toward the boom.

An object of the invention is to provide a fair-lead construction for the purpose described having positive means to keep the fair-lead always directed toward the boom.

Another object is to provide a rotatable fair-

2 lead construction having sheaves for a plurality of cables coming into the fair-lead approximately on its axis of rotation and leaving the fair-lead at angles to said axis in the directions of the boom base and boom tip.

Another object is to provide a fair-lead mounting for rotation about an axis and having a cable opening for a plurality of cables coming into said fair-lead approximately on said axis.

Another object is to provide a rotatable fair-lead construction for handling a plurality of cables from cable drums or sheaves on stationary axes so as to maintain the various cables out of contact with each other through a wide angle of rotation of the fair-lead.

Another object is to provide a masthead fair-lead mounted for rotation in rollers on a roller platform, wherein the platform has a central cable opening beneath the fair-lead for receiving a plurality of cables approximately on the axis of rotation.

Another object is to provide a fair-lead rotatably mounted on a masthead so as to be capable of receiving a plurality of vertical cables substantially on the axis of rotation of the fair-lead, and returning at least one of said cables downwardly in a near vertical direction.

Another object is to provide a masthead fair-lead having a carrier rotatably mounted on said masthead, a plurality of sheaves mounted on an axle in the carrier, so as to receive cables approximately on the axis of rotation of the carrier, and means on the carrier adapted for attachment to a crane boom and the like to direct the sheaves toward said boom.

These and other objects are accomplished in the construction which will now be described with reference to the accompanying drawings. The present construction is shown and described for the purpose of illustrating the principles of the invention in a preferred embodiment, and not for the purpose of limiting the invention. Various changes in the construction and arrangement of parts will occur to those skilled in the art, and all such modifications are included in the invention, the same being limited only by the scope of the appended claims.

In the drawings:

Figure 4 is a view taken on the line 4—4 of Figure 3;

Figure 5 is a view taken on the line 5—5 of Figure 3;

Figure 6 is a view taken on the line 6—6 of Figure 5;

Figure 7 is a force diagram showing the forces acting on the fair-lead carrier to turn it in the direction of the boom;

Figure 8 is a vertical sectional view showing a modified form of fair-lead, taken approximately on the line 8—8 in Figure 11;

Figure 9 is an enlarged fragmentary sectional view showing the single bearing construction of the fair-lead;

Figure 10 is a view taken on the line 10—10 of Figure 8 with the sheaves omitted;

Figure 11 is a rear elevation view of the fair-lead with parts shown in section; and Figure 12 is a perspective view of a sheave pin retaining block or keeper.

Figure 1:
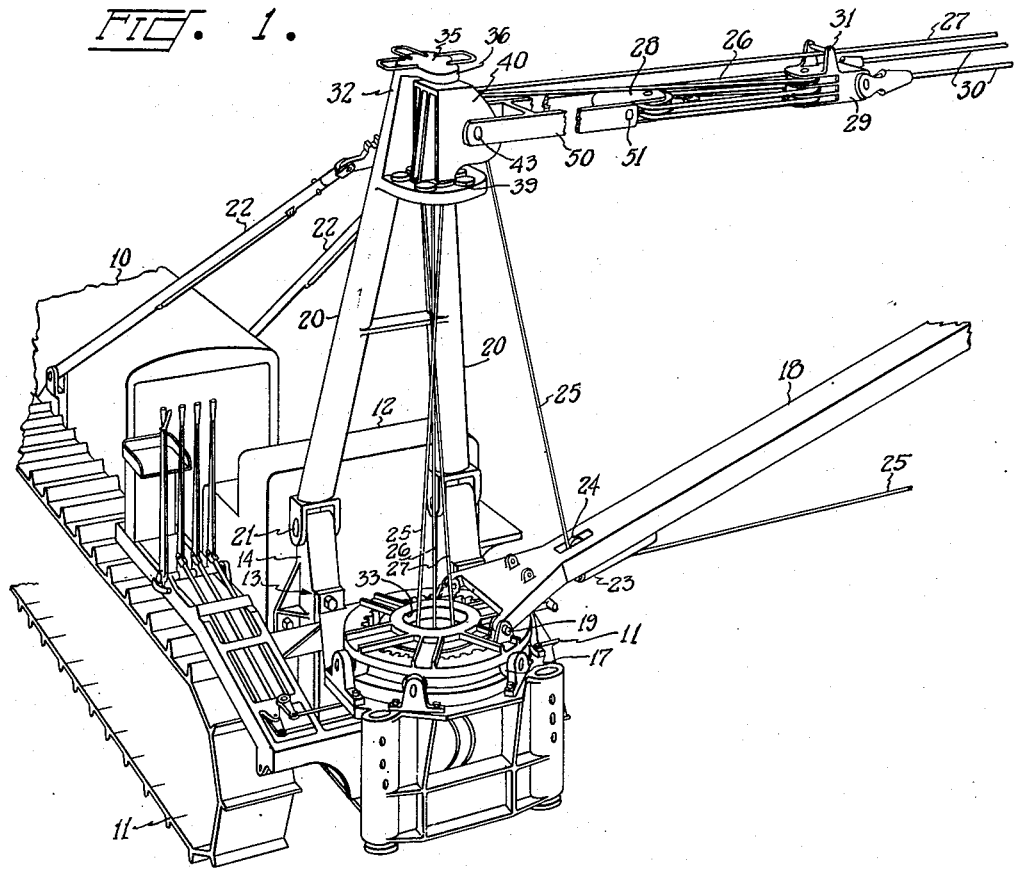
Figure 1 is a fragmentary perspective view of a tractor mounted crane equipped with a masthead fair-lead embodying the principles of the invention.
Figure 2:
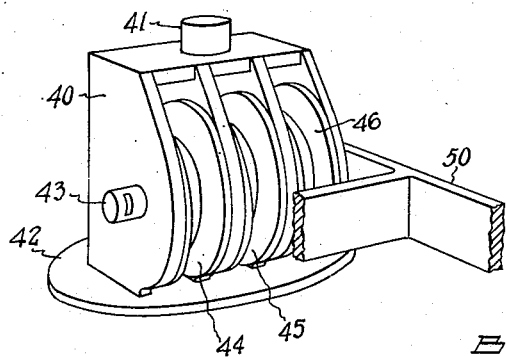
Figure 2 is a perspective view of the fair-lead carrier itself.
Figure 3:
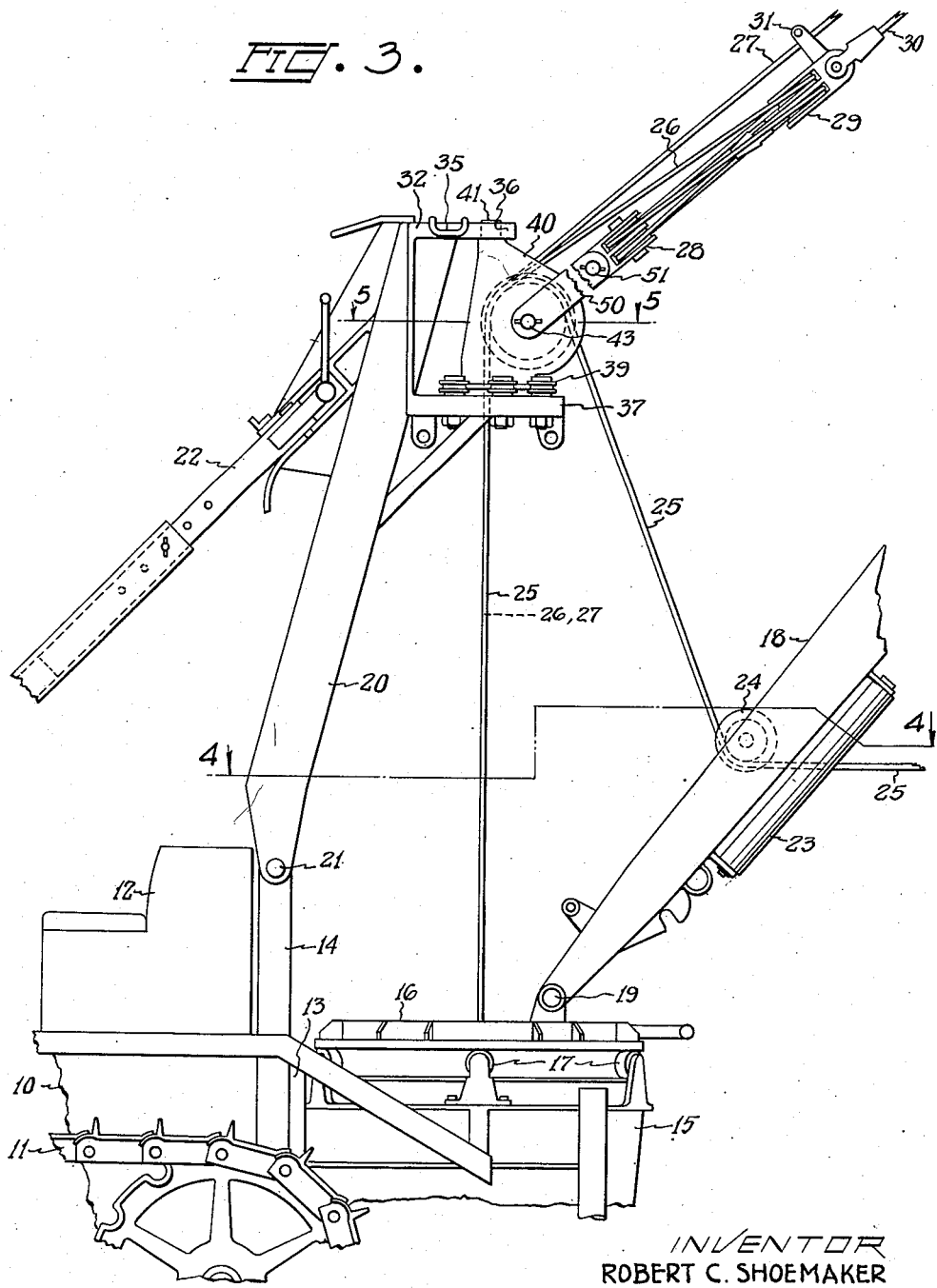
Figure 3 is a view in side elevation of the structure shown in Figure 1.

In Figures 1 and 3 there is shown the rear portion of a tractor 10 having crawler traction units 11 and driver's seat 12, the tractor having mounted thereon a removable crane structure embodying various novel features disclosed and claimed in my copending applications entitled Tractor Mounted Crane Mast and Backstay System, Serial No. 626,113, filed November 1, 1945 (now Patent No. 2,564,929, issued August 21, 1951), Crane Boom Assembly, Serial No. 626,114, filed November 1, 1945, now Patent No. 2,595,896, issued May 6, 1952, and Tractor Mounted Crane, Serial No. 626,115, filed November 1, 1945, now Patent No. 2,595,897, issued May 6, 1952.

For mounting the crane as accessory equipment, the tractor carries at its rear end closely adjacent its rigid supporting axle a semi-permanent mounting bracket 13 having a pair of upstanding arms 14. Removably secured on the lower part of the mounting bracket 13 in driving relation with a power take-off gear from the tractor is a hoist unit 15 carrying a revolving bull wheel 16 on a plurality of rollers 17. A boom 18 is pivotally supported on the bull wheel by means of heel pins 19 so that the boom can be raised and lowered through a vertical angle and swung on the bull wheel through a horizontal angle of approximately 240 degrees.

An A-frame mast 20 is pivotally mounted at its base on heel pins 21 in the upper ends of the arms 14 of the mounting bracket, and secured at its upper end by means of adjustable backstay struts 22. The crane is shown rigged for use with a dragline scraper having a scraper line 25 directed through a sheave 24 associated with fair-lead rollers 23 on the heel section of the boom. The numeral 27 designates a haul-back line for the scraper, and the numeral 26 designates a boom suspension line which is trained around sheaves in a pair of boom suspension blocks 28 and 29. The block 29 is directly connected with a line or link 30 for supporting the tip of the boom, and is equipped with a guide 31 for the line 27.

The present invention is concerned with the construction of a novel masthead fair-lead for handling the three lines 25, 26 and 27, to operate the scraper and to raise and lower the boom from a relatively stationary masthead structure 32 while at the same time permitting the swinging of the boom through a wide horizontal angle. When the crane is rigged and set up for operation in this manner the backstay struts 22 are adjusted so that the three cables 25, 26 and 27 are directed from the masthead 32 approximately vertically downwardly to the center of the bull wheel 16. The bull wheel has a central cable opening 33 through which the cables pass to winches or sheaves (not shown) in the hoist unit in the approximate side by side relation shown in the drawings whereby they are grouped closely about the axis of rotation of the bull wheel. The boom actually revolves about an axis approximately coincident with the central cable 26, and it is the function of the masthead fair-lead to rotate with the boom so as to direct the various cables outwardly toward the boom and to lead them downwardly from a point remote from the hoist unit for proper spooling on the winch drums, and to keep them free and clear of each other.

In the present embodiment the masthead 32 comprises a rearwardly extending top arm 35 having a vertical bearing 36, and a supporting base in the form of a circular roller platform 37 directly therebeneath. The roller platform has a central cable opening 38 and a plurality of rollers 39 arranged in a circle therearound concentric with the axis of the bearing 36. The movable part of the fair-lead comprises a carrier housing 40 having a vertical journal or trunnion 41 rotatable in the bearing 36 and a circular bottom plate 42 rotatable in the circle of rollers 39. Each of the rollers is preferably mounted on an eccentric stub axle or shaft 47 on a bolt 48 secured to the roller platform as shown in Figure 6 to provide sufficient adjustability for the free turning of the carrier 40. Mounted in the carrier 40 is a shaft or axle 43 on which are three independently rotatable sheaves 44, 45 and 46 for the three cables. The sheave size and shaft position are selected so that the vertical reach of the central cable 26 will be disposed on the axis of rotation of the carrier 40, and so that the outer reach of the cable 25 may be directed downwardly from the sheave 44 over the edge of the roller platform 37 to the boom sheave 24 in any position of the boom. To allow sufficient clearance over the edge of the roller platform, the sheave 44 should be able to direct the cable 25 substantially vertically downwardly approximately parallel with its vertical reach extending upwardly from the bull wheel.

Pivotally mounted on the outer ends of the shaft 43 is a rigid block connector link or arm 50 attached at its outer end by a connector pin 51 to the boom suspension block 28. An important function of the link 50 is to keep the carrier 40 always turned in the direction of the boom. It will be apparent that unequal tension in the outer cables 25 and 27 will tend to produce a turning moment in the fair-lead carrier depending upon the difference in tension in the two cables and the spacing of their sheaves from the axis of rotation of the carrier. In the operation of a drag line scraper alternate tension and slack in the cables 25 and 27 tend to swing the carrier from side to side, and such action would occur if there were no means to prevent it. However, if the link 50 is made relatively long in comparison with the spacing of the cables 25 and 27, a relatively small tension on the link 50 will prevent excessive deflection of the fair-lead carrier even under an extreme condition of eccentric loading of the scraper and haul-back cables.

It will be observed that as the carrier 40 is deflected away from the direction of the boom, the effective length of the lever arm of cable 25, for instance, with respect to the axis of rotation varies as the cosine of the angle of deflection, whereas the effective length of the lever arm of the link 50 about the axis of rotation varies as the sine of the angle of deflection. Therefore, after a relatively small deflection the lever arm of the link 50 is equal to the lever arm of the sheave 44, and for a larger deflection the lever arm of the links greatly exceeds the lever arm of the sheave.

This is illustrated in Figure 7, wherein the link 50 is represented by the line 50 directed toward the boom, the points 25, 26 and 27 indicating the relative spacing of the cables in the sheaves in plan view and the point 51 representing the pin 51 in the end of the links. If the fair-lead is now assumed to be deflected through an angle by a difference in tension in the cables 25 and 27 so as to move the various elements to the new positions indicated by primed reference numerals, the horizontal component of the resulting unbalanced force may be represented by the force vector 25″ having a lever arm equal to the distance 53 which remains substantially constant for small angles. Such a deflection of the carrier, however, would move the pin connector 51 to the new position 51′ where the lever arm of the link in the position 50′ has increased to the length indicated at 52 which is greater than the lever arm 53 of the cable. With even this small amount of deflection in the fair-lead carrier, the force 28′, representing the horizontal component of the tension in the block 28, would be able to balance a considerably superior force 25″ to keep the fair-lead always turned approximately in the direction of the boom to handle the cables without excessive rubbing against the sheaves. The effectiveness of the restoring force may be increased as desired by merely lengthening the link 50. The tension in cable 26 also exerts a restoring force to prevent deflection of the fair-lead since the cable wraps over the top of its sheave, but the lever arm is so short this vector is disregarded.

Reference is made to my copending applications for a complete disclosure of the present crane structure, this application being concerned only with the masthead fair-lead and boom suspension blocks associated therewith. It is pointed out, however, that the features of novelty in the fair-lead arise through special requirements inherent in the crane construction and rigging. One of these requirements is to resist the overturning moment on the boom. In the present crane the bull wheel takes only the boom thrust, the overturning moment being resisted by the mast, through the fair-lead, entirely independently of the bull wheel which then need not be designed to withstand such forces. To accomplish this purpose the mast is mounted directly on the tractor frame through the rigid arms 14 on the mounting bracket, in non-rotating relation to the boom. The cable drums or sheaves in the hoist unit being also mounted on fixed axes, the fair-lead must satisfy the further requirement of receiving a plurality of cables in a vertical direction approximately on the fair-lead axis and disposing of these cables in the direction of the boom without interference with each other or parts of the structure and without excessive rubbing on the sheaves. When the crane is rigged with a dragline scraper, the fair-lead must be further capable of directing the scraper line nearly vertically downwardly through the base of the boom. At all times, and particularly in scraper operation, the fair-lead must be capable of resisting turning moments from eccentric loading which would twist the sheave grooves out of alignment with the cables going to the boom. The present fair-lead fulfills these requirements so as to utilize to the fullest extent the numerous features and advantages of the crane referred to hereinabove and in the copending applications.

The purpose of the guide 31 is to keep the cable 27 from falling below the block 29 and getting caught thereunder. This feature, also, is particularly important in scraper operation when the line 27 is slacked to throw the scraper beyond the length of the boom.

To rig the crane for hoisting instead of dragline scraper operation, the line 25 is removed from the fair-lead, and the line 27 is used as the hoist line. When there is no tension in the hoist line, the only forces acting on the masthead fair-lead are from the tensions in cable 26 and block 28, both of which act in a line through the axis of rotation of the fair-lead. When the hoist line 27 is tensioned, the fair-lead carrier is subjected to a turning moment which will produce a small deflection sufficient to establish an opposite balancing moment through the link 50 in the manner illustrated in Figure 7. The fair-lead sheaves are designed to handle the cables satisfactorily under a small deflection such as occurs in normal operation, and if it is desired to reduce the deflection for a given load a longer link 50 may be employed.

In the present crane construction, the position of the mast with respect to the bull wheel allows the boom to swing through a horizontal angle of approximately 240 degrees, the backstay struts 22 being effective in compression to hold the mast rigid at the limits of the swing. The fair-lead carrier 40 follows the boom in all its movements, twisting the three cables as shown in Figure 1 without bringing them into contact with each other or interfering with their spooling on the winch drums in the hoist unit. The fair-lead itself, however, is capable of considerably more than 240 degrees rotation and no limitation thereon is intended by reference to a particular angle of boom swing.

Figures 8 to 12 illustrate a modified and preferred form of masthead fair-lead construction in which the rotatable sheave carrier is mounted in a single bearing on the masthead. The top pivot 41 and bearing 36 in Figure 6 are eliminated. In Figure 8 the sheave carrier housing 100 is mounted in the single heavy bearing 102 which is welded into the masthead platform base 101. The platform is braced to the two mast legs 20 by brackets 99. Bearing 102 has a bottom thrust flange 103 defining a circular cable opening 104 for the three cables 25, 26 and 27.

The carrier 100 has a circular base 105 equipped with a journal portion 106 rotatably mounted and seated in the bearing 102, the latter preferably being lined with a bottom washer 107, a bushing 108 and a split top washer 109. The parts are secured in assembled relation by a split bearing plate 110 which is secured to the bearing 102 by cap screws 111. Shims 112 provide adjustment to compensate for wear in the thrust washers 107 and 109. As best illustrated in Figure 9, downward thrust on the carrier 100 is resisted by thrust flange 103 and washer 107 bearing against the bottom end surface of journal portion 106, and upward thrust is resisted by bearing plate 110 and washer 109 acting against a top shoulder 113 on the journal portion 106. A sufficient number of cap screws 111 are employed to form an adequately strong cantilever bearing, so that no upper pivot is required for the carrier.

An important feature of the bearing illustrated in Figures 8 and 9 is that its greatest dimension is perpendicular to the axis of rotation whereby the moment in the bearing, which is the principal load on the present bearing, is resisted by flat thrust washers of large area instead of the cylindrical bearing surface as is customary. The cylindrical bushing 108 assumes only the horizontal sheer loads, which are less severe. Thus the principal wear occurs upon the flat thrust washers 107 and 109 which are relatively inexpensive to make and easy to replace. Furthermore, before these washers 107 and 109 are worn sufficiently to require replacement, adjustment for wear is readily effected by removal of the shims 112, one by one, as the wear occurs. In conventional bearings where the principal wear occurs upon the cylindrical surface, the only available remedy is to provide replaceable bushings; it is not possible to make provision for gradual take-up by the removal of shims or other means of small adjustment.

The carrier base 105 has an intermediate neck portion of reduced diameter containing a plurality of annular grooves 116 facing the edge surfaces of the washer 109 and bearing plate 110. The grooves 116 constitute a grease labyrinth to keep rain water from getting into the bearing and to hold a reserve supply of lubricant for the bearing. This detail is not shown in the general view of Figure 8 but will be seen in the enlarged view of Figure 9.

The carrier base 105 is apertured to provide an elongated cable opening 114, and the thrust flange 103 of bearing 102 may be equipped with eyes 115 for lifting or supporting various equipment from the masthead.

The three sheaves 44, 45 and 46 are mounted on a common horizontal shaft 120 in the carrier 100 substantially as illustrated in the embodiment of Figures 5 and 6, the dimensions and proportions of the parts being such that the upper end of the vertical reach of the middle cable 26 is disposed on the vertical axis of rotation of the carrier 100, and also in the vertical plane through the crane boom. Cables 25 and 27 must, obviously, engage their respective sheaves at a distance on opposite sides of the vertical plane through the boom, whereby any working conditions producing unequal tension in these two cables, or eliminating one of them, will produce eccentric loading on the sheave carrier tending to rotate the carrier sheaves away from the proper direction of lead for the cables going to the boom, as previously explained in connection with Figure 7.

To prevent excessive lateral deflection of the carrier 100 an elongated link 121 is connected with the carrier to exert a superior turning moment on the carrier, as in the case of link 50 in Figure 1, holding the carrier always turned in the direction of the boom. Link 121 has two parallel arms pivotally mounted on shaft 120 and rigidly connected together by cross member 119, the same as link 50, to hold the shaft perpendicular to the link, so that when the link is turned by the swinging of the boom, the shaft 120 is maintained perpendicular to the vertical plane through the boom. The parallel reaches of the boom suspension link 30 in Figure 1 lie on opposite sides of this vertical plane, and the reaches of cables 25 and 27 extending from the masthead fair-lead to the boom depart from this plane only to the extent that the centers of the grooves in sheaves 44 and 46 are spaced from the groove in the central sheave 45. The link 121 is stiffened laterally by suitable struts and web or flange plates to prevent lateral bending, whereby the length of the link from the shaft 120 to the lower block connector pin 51 is effective as a long lever arm to exert a restoring torque on the fair-lead carrier as represented by the line 50' in Figure 7.

In this embodiment the link 121 is retained on the shaft by pairs of keepers 122, illustrated in Figure 12, which engage annular grooves 123 in the shaft. The keepers 122 are secured to the link 121 by cap screws 124.

The lower pulley block 28, at pin 51, is equipped with a cable guide 31 for the cable 27 in the same manner that the upper block 29 was so equipped in the embodiment shown in Figure 1. In Figure 8 the cable 26 has been broken away to show the lower block sheaves 130. The upper pulley block 29 is not shown, it being understood that the cable 26 is reeved back and forth between the lower and upper blocks 28 and 29, as illustrated in Figure 3, having its end anchored in one of the blocks depending upon the number of sheaves in the blocks.

In ordinary hoisting work, the cable 25 is not used, and the hoisting tension in cable 27 produces a deflecting torque on the sheave carrier which is resisted by the tension on link 121 exerted by the boom suspension link 30 in Figure 3 acting through the cable 26. In dragline scraper work, the cables 25 and 27 are tensioned alternately in pulling the scraper in and hauling it back, tending to deflect the carrier 100, first in one direction and then the other, away from its proper direction of lead in the vertical plane of the boom. The link 121 prevents the carrier from oscillating from side to side and keeps the sheaves 44, 45 and 46 parallel with the vertical plane through the boom, so that the cables will not rub unnecessarily on the flanges of the sheaves.

The present fair-lead is used not only with a crane boom for crane and dragline scraper work, but also with shovel booms and back hoe booms. In the use of back hoe equipment the blocks 28 and 29 are not necessary, and then cable 26 runs from the masthead fair-lead to and around a sheave on the upper end of the dipper stick and then back to an anchor point at the outer end of link 50 in Figure 1, or link 121 in Figure 8. With such equipment the boom moves up and down constantly and the link 50 or 121 follows it, illustrating the need for a free bearing for the link on shaft 43 or 120 of the fair-lead.

Having now described my invention and in what manner the same may be used, what I claim as new and desire to protect by Letters Patent is:

1. A masthead fair-lead construction for boom suspension and hoisting cables comprising a roller platform having an opening for the passage of cables therethrough, a plurality of rollers arranged in a circle around said opening, a masthead bearing spaced above said platform on the axis of said circle, a sheave carrier journaled in said rollers and said bearing, a plurality of sheaves mounted substantially side by side on a common shaft in said carrier for receiving boom suspension and hoisting cables through said opening whereby at least one of said cables is spaced from said axis, said sheaves leading said cables in a common direction toward the boom, and a connector link on said carrier having means for connection with said boom suspension cable to counteract eccentric loading of said sheaves about said axis and turn said carrier in said common direction of said cables.

2. In a crane structure and the like having a mast and a boom; a supporting base mounted on the mast having a cable opening and bearing means, a masthead fair-lead disposed above said cable opening, said fair-lead comprising a housing rotatably mounted in said bearing means for rotation about a turning axis in said bearing means passing through said cable opening, a horizontal shaft in said housing, a sheave on said shaft adapted to guide a boom suspension cable in alignment with said turning axis, additional sheaves on said shaft adapted to guide additional cables through said cable opening adjacent said boom suspension cable, whereby said additional cables impose a turning moment on said housing about said axis, and an arm on said housing adapted to be tensioned by said boom suspension cable to turn the fair-lead in the direction of the boom.

3. A masthead fair-lead as defined in claim 2 wherein said supporting base comprises a platform projecting horizontally from one side of the head of the mast whereby said cable opening and turning axis of the fair-lead housing are disposed at said one side of the mast.

4. A masthead fair-lead as defined in claim 2 in which said additional sheaves comprise a hoisting cable sheave on one side of said first sheave and another sheave on the opposite side of said first sheave, all of said sheaves being adapted to guide their respective cables in approximately parallel relation through said cable opening.

5. A masthead fair-lead as defined in claim 2, said bearing means comprising a plurality of rollers arranged in a circle on said supporting base, and said housing being mounted for rotation in said plurality of rollers.

ROBERT C. SHOEMAKER.

References Cited in the file of this patent

UNITED STATES PATENTS

| Number | Name | Date |
|---|---|---|
| 810,691 | Allen | Jan. 23, 1906 |
| 978,202 | Prescott | Dec. 13, 1910 |
| 1,628,972 | Hansen | May 17, 1927 |
| 1,856,907 | Chapman | May 3, 1932 |
| 2,223,863 | Wunsch | Dec. 3, 1940 |
| 2,264,569 | Holmes | Dec. 2, 1941 |
| 2,595,897 | Shoemaker | May 6, 1952 |